May 3, 1932.  J. C. MITCHELL  1,856,581
PIPE JOINT
Filed Feb. 27, 1930

Inventor
J. C. Mitchell
By his Attorneys
Cooper, Kerr & Dunham

Patented May 3, 1932

1,856,581

UNITED STATES PATENT OFFICE

JOHN C. MITCHELL, OF BLOOMFIELD, NEW JERSEY, ASSIGNOR TO LOCK JOINT PIPE COMPANY, OF AMPERE, NEW JERSEY, A CORPORATION OF NEW JERSEY

PIPE JOINT

Application filed February 27, 1930. Serial No. 431,699.

This invention pertains to pipe joints of the kind in which the joint is made tight by means of a gasket fitted between the pipes.

For purpose of illustration the invention is shown as applied to the well known bell and spigot type of joint. In such a joint the bell is usually recessed while the spigot is cylindrical and smoot. In case the pipes move relatively to each other due to temperature changes, heaving of the ground, etc., the spigot, being cylindrical, slides relatively to the gasket, which remains fixed in the bell. The gasket is usually of some malleable metal such as lead, and sometimes contains a resilient core, as is shown in my copending applications Serial Nos. 95,535 and 95,536, filed March 18, 1926, of which this application is a continuation in part.

In the above applications the gasket is preshaped to fit the recess or groove in the bell and is placed in the recess before the joint is assembled.

An object of the present invention is to provide a gasket which need not be pre-fitted but which may be slipped between bell and spigot and then be expanded to fill the recess in the bell.

Further and other objects and advantages will appear from the specification and claims, and from the drawings which illustrate what is now considered the preferred embodiment of the invention.

The spigot pipe is designated 10 and the bell 12. In the embodiment of the invention herein shown the gasket is inserted and caulked from the inside of the pipe,—therefore the open end of the bell has a flange 14 projecting inwardly to almost touch pipe 10.

Figure 1:
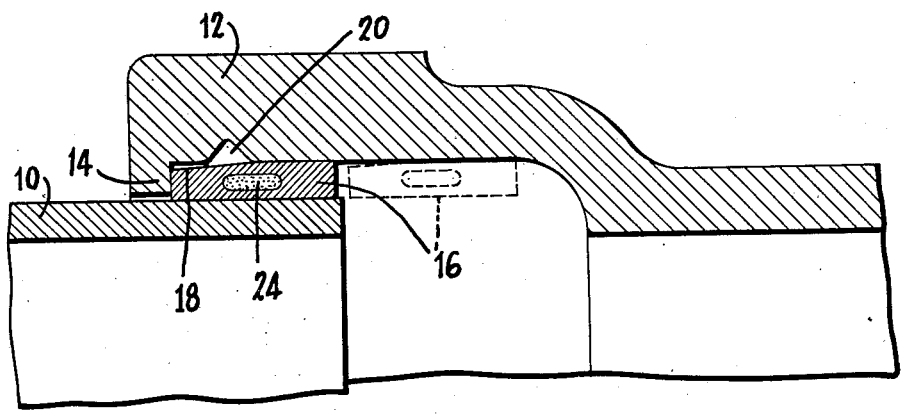
Fig. 1 is a cross-section of the joint after the gasket is inserted but before it is expanded.

Preferably, annular gasket 16 is first placed in the dotted line position of Fig. 1 and then pushed into the annular space between the bell and spigot as shown in full lines in Fig. 1; but it may, if desired, be initially placed as shown in full lines in Fig. 1. The gasket may be tapered as at 18 for ease of insertion.

Bell 12 has an annular groove 20 in its inner surface and it is necessary to expand the gasket after insertion in order to fill the groove. This is done by caulking the gasket at its exposed end, or edge, by means of a tool such as 22. If the gasket were of uniform structure throughout, the only effect of the caulking operation would be to expand and tighten the gasket for a short distance inwardly from the exposed edge. The effect of the caulking tool could not be transmitted through the malleable metal of the gasket sufficiently to deform the gasket into recess 20.

In order to bring about the desired result I make the gasket hollow in the region adjacent the recess, and fill the hollow with a resilient fibrous core 24. The initial shape of the gasket cavity is as shown in Fig. 1, being disposed lengthwise of the gasket cross-section and leaving comparatively thin walls on the sides thereof.

Figure 2:
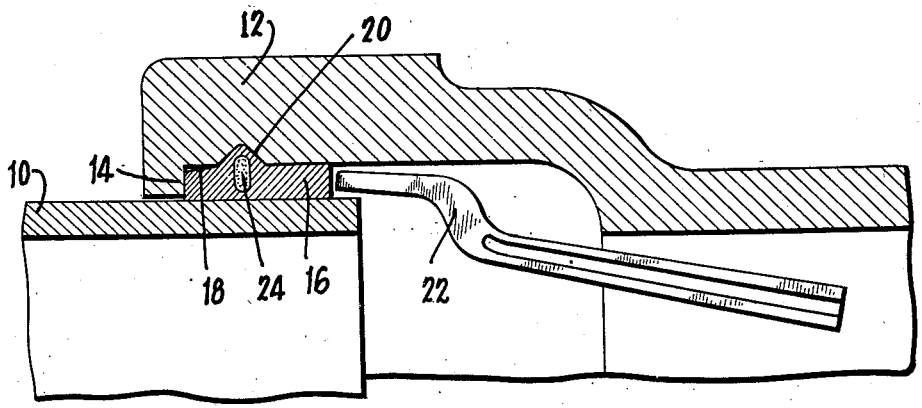
Fig. 2 is the same as Fig. 1 after expanding.

When the caulking tool is applied the gasket is driven in compression against abutment flange 14 and the weak portion of the gasket, assisted by the outward pressure of the resilient core 24, is deformed or expanded until recess 20 is tightly filled. As the deformation takes place the gasket shortens in length and when the operation is complete the gasket cavity and core assume a position crosswise of the gasket, substantially as in Fig. 2.

After recess 20 is filled, further caulking produces the usual result of expanding and tightening the gasket in the region adjacent the exposed edge. When the job is complete, therefore, the gasket is tight near its edge and also at the region of the recess, remote from the exposed edge.

It is to be understood that the invention is not limited to the specific construction herein illustrated and described but may be used in other forms without departure from its spirit as defined by the following claims.

I claim—

1. A gasket for bell and spigot pipe joints comprising a ring of malleable material substantially rectangular in cross section and having a pocket located substantially centrally between its lateral edges to produce weakened side walls of uniform thickness and an excess of caulking material at each lateral edge, and a core of resilient material filling said pocket whereby when caulked from either lateral edge the weakened side walls will be distorted and pressed into engagement with the walls of the bell and spigot pipe and whereby the resilient material will tend to hold said walls in the distorted position.

2. A gasket for bell and spigot pipe joints wherein the bell pipe is provided with an annular groove in its inner wall, comprising a ring of malleable material substantially rectangular in cross section and having a pocket located substantially centrally between its lateral edges to produce weakened side walls of uniform thickness and an excess of caulking material at each side edge, and a core of resilient material filling said pocket and having its axis in line with the major transverse axis of the ring, said ring when caulked from either end causing the weakened side walls to be distorted and pressed into engagement with the walls of the bell and spigot pipes and one of said weakened walls to be deflected into the annular groove, the core of resilient material being also deflected whereby its major transverse axis is at a substantial right angle to its original major transverse axis and serves to hold the weakened side wall in the groove.

In testimony whereof I hereto affix my signature.

JOHN C. MITCHELL.